Nov. 8, 1949     F. R. GOEHRING     2,487,436
PLUG COCK
Filed June 21, 1945

INVENTOR.
FRANCIS RUDOLPH GOEHRING
BY
Jas. C. Wobensmith
ATTORNEY

Patented Nov. 8, 1949

2,487,436

UNITED STATES PATENT OFFICE 2,487,436

PLUG COCK

Francis Rudolph Goehring, Philadelphia, Pa., assignor, by mesne assignments, to Minneapolis-Honeywell Regulator Company, Minneapolis, Minn., a corporation of Delaware Application June 21, 1945, Serial No. 600,658

6 Claims. (Cl. 251—103)

1

This invention relates to plug cocks, and it relates more particularly to the construction and arrangement of plug cocks of the larger sizes, and to those which are used for the control of liquid materials as to which leakage at the ends of the plug would be more than ordinarily objectionable.

Heretofore, the most common form of plug cock comprised a casing, having means for mounting the same in a pipe line, and provided with a rotatable tapered plug having a central port for the passage therethrough of the material to be controlled. In such construction, the taper of the plug is depended upon to prevent leakage, and in some instances the plugs are "spring loaded" to enhance the efficiency of the engagement of the contacting surfaces of the plug and the casing.

However, in the larger sizes of plug cocks, if the taper, and the spring loading when used, are such as to prevent leakage at the ends of the plug, the friction is necessarily quite large and the rotation of the plug in the casing is very difficult.

The principal object of the invention is to provide a plug cock which is so constructed and arranged as to permit the plug to be rotated easily and without undue resistance, and at the same time to provide a construction in which leakage at the ends of the plug is prevented.

With the foregoing object in view, my invention contemplates the provision of a plug cock in which the plug is without taper, that is to say, the operating portion thereof is of a straight cylindrical form but the same is provided with compression springs arranged and operating in a novel manner to insure an effective seal at each end of the plug where the same extends through the casing.

Figure 1:
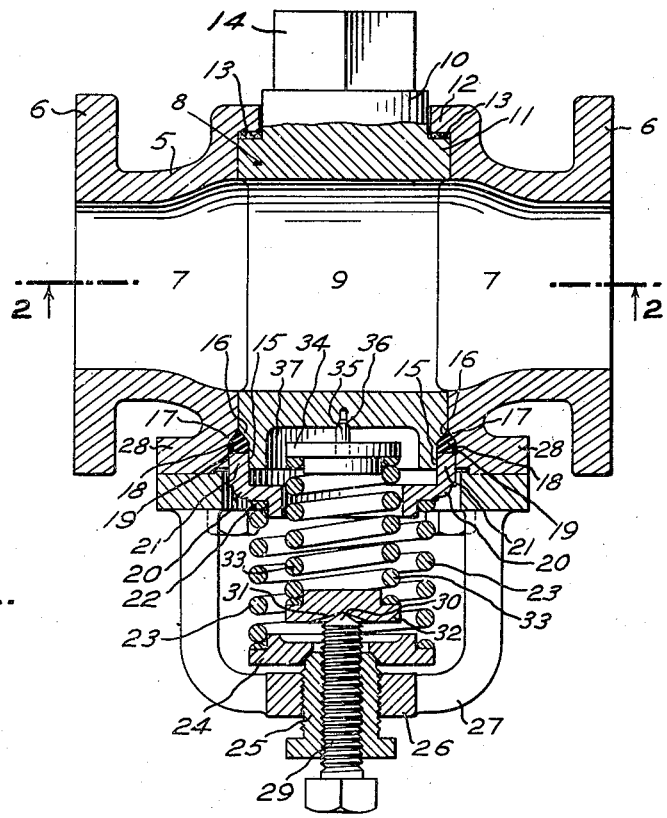
Figure 2:
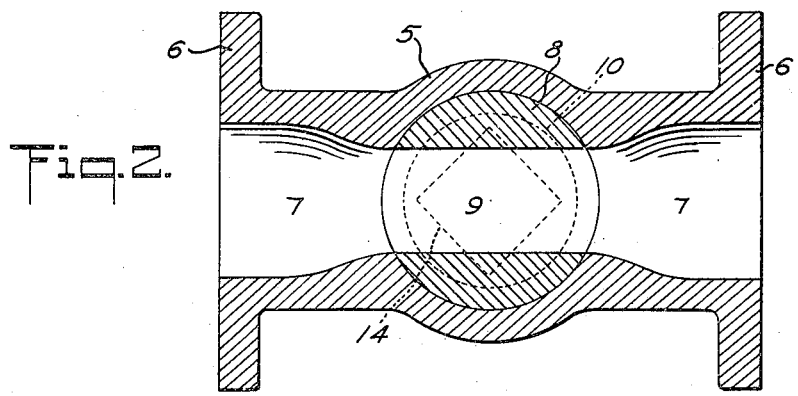

The nature and characteristic features of the invention will be more readily understood from the following description, taken in connection with the accompanying drawing forming part hereof, in which:

Figure 1 is a vertical central sectional view of a plug cock embodying the main features of the present invention, portions thereof being shown in elevation; and Fig. 2 is a horizontal section taken approximately on the line 2—2 of Figure 1.

It should, of course, be understood that the description and drawing herein, are illustrative merely, and that various changes and modifications may be made in the structure disclosed without departing from the spirit of the invention.

2

Referring to the drawing, 5 is the body casing which, by reason of the invention being particularly applicable for the larger sizes of plug cocks, is shown as provided with flanges 6 for connecting the cock in the pipe line where the same is to be used. Of course, if the device should be made in the smaller sizes, the usual internally threaded ends for the pipe connections would be provided instead of the flanges.

The body 5 has the usual passageway 7 extending therethrough. The plug 8 comprises a member having its main operating portion of a straight cylindrical form with a central port 9 passing therethrough, and adapted to register with the passageway 7 in the body 5. The plug 8 is reduced in diameter as at 10 at its upper end to provide shoulder 11 which co-acts with an internal ledge 12 provided in the body 5 at the place where the reduced portion 10 of the plug 8 extends through the body 5.

Interposed between the shoulder 11 and the ledge 12 is an annular gasket 13, of any suitable packing material preferably of a semi-hard character which, when compressed in the manner to be hereinafter set forth, will serve effectively to prevent leakage at that end of the plug. The protruding portion of the plug member 8 may be squared, as at 14, to enable the plug to be rotated to open or close the cock.

The other end of the plug 8 is also reduced in diameter, as at 15, and is so shaped as to provide an inclined shoulder 16 which registers with a similarly inclined shoulder 17 in an annular recess 18 in the body or casing 5. The reduced portion 15 of the plug 8 and the recess 18, together serve to provide an annular space in which packing 19 is disposed.

The packing 19 is held in place, and is compressed, by means of an annulus 20 having a portion 21 which extends into the annular space above described. The annulus 20 is provided with a seat 22 for one end of a coil spring 23. The other end of the coil spring 23 is seated in a disc member 24. The disc member 24 is engaged by the rounded inner end of a threaded bushing 25 which is mounted in a complementally threaded portion 26 of a yoke member 27, which is bolted to a suitable flange 28 provided on the body portion 5 of the cock. The bushing 25, which is threaded in the yoke 27, serves as a means for regulating the tension of the coil spring 23 which compresses the packing 19 through the medium of the annulus 20.

The bushing 25 is also bored centrally and is internally threaded for the reception of a bolt 29, the inner end of which is preferably pointed, as at 30, and bears against a recess 31 in a disc member 32. The disc member 32 serves as a seat for one end of a coil spring 33, the other end of which bears against a similar disc member 34. The disc member 34 is provided with a central teat 35 which is seated in a suitable depression 36 in the lower end of the plug 8. The lower end of the plug may also be recessed as at 37 for the location therein of the disc member 34 in which the upper end of the coil spring 33 is seated. The coil spring 33 serves as a means for compressing the packing 13 independently of the compression of the packing 19 by the coil spring 23. The coil spring 33 is concentrically disposed in the interior of the coil spring 23, thus reducing the overall height of the device.

It will be seen that by the foregoing arrangement the compression of the packing 13 may be readily adjusted by the bolt 29, that said adjustment may be made independently of the adjustment of the compression of the packing 19 which is effected by the adjustment of the threaded bushing 25. By this arrangement leakage at the respective ends of the plug may be readily eliminated, and this without unduly increasing the friction which would interfere with the free actuation of the plug to open and close the cock.

I claim:

1. A plug cock comprising a body having a passageway extending therethrough, a straight cylindrical plug member rotatably mounted therein and having a port adapted to register with the passageway in the body, packing at each end of said plug in engagement therewith, separate springs at one end of the plug, one of said springs being directly effective for compressing one of said packings and the other of said springs being effective on said plug for urging said plug into engagement with the other of said packings, and means for varying the tension of said springs independently of each other.

2. A plug cock comprising a body having a passageway extending therethrough, a straight cylindrical plug member rotatably mounted therein and having a port adapted to register with the passageway in the body, one end of said plug member being reduced in diameter to provide a shoulder, a coacting ledge in the body portion, packing interposed between said shoulder and said ledge, packing at the other end of said plug, a coil spring for compressing said packing, means for varying the tension of said spring, a second spring impelling the plug to compress the first mentioned packing, and means for varying the tension of said spring independently of the tension of the first mentioned spring.

3. A plug cock comprising a body having a passageway extending therethrough, a straight cylindrical plug member rotatably mounted therein and having a port adapted to register with the passageway in the body, one end of said plug member being reduced in diameter to provide a shoulder, a coacting ledge in the body portion, packing interposed between said shoulder and said ledge, packing disposed at the other end of the plug member in engagement with said body and said plug member, an annular member bearing against said packing to compress the same, a spring bearing against said annular member, means for varying the tension of said spring, a second spring impelling the plug to compress the first mentioned packing, and means for varying the tension of said spring independently of the tension of the first mentioned spring.

4. A plug cock comprising a body having a passageway extending therethrough, a straight cylindrical plug member rotatably mounted therein and having a port adapted to register with the passageway in the body, one end of said plug member being reduced in diameter to provide a shoulder, a coacting ledge in the body portion, packing interposed between said shoulder and said ledge, the other end of said plug being reduced in diameter and the body being complementally recessed to provide an annular space, packing disposed in said annular space, an annular member bearing against said packing to compress the same, a spring bearing against said annular member, means for varying the tension of said spring, a second spring impelling the plug to compress the first mentioned packing, and means for varying the tension of said spring independently of the tension of the first mentioned spring.

5. A plug cock comprising a body having a passageway extending therethrough, a straight cylindrical plug member rotatably mounted therein and having a port adapted to register with the passageway in the body, one end of said plug member being provided with a shoulder, a coacting ledge in the body portion, packing interposed between said shoulder and said ledge, the body at the other end of the plug being recessed to provide an annular space, packing disposed in said annular space in engagement with the periphery of the plug, an annular member bearing against said packing to compress the same, a spring bearing against said annular member, means for varying the tension of said spring, a second spring impelling the plug to compress the first mentioned packing, and means for varying the tension of said spring independently of the tension of the first mentioned spring.

6. A plug cock comprising a body having a passageway extending therethrough, a straight cylindrical plug member rotatably mounted therein and having a port adapted to register with the passageway in the body, one end of said plug member being provided with a shoulder, a coacting ledge in the body portion, packing interposed between said shoulder and said ledge, the body at the other end of the plug being recessed to provide an annular space, packing disposed in said annular space in engagement with the periphery of the plug, an annular member bearing against said packing to compress the same, a spring bearing against said annular member, means for varying the tension of said spring, a second spring concentrically disposed with respect to said first spring impelling the plug to compress the first mentioned packing, and means for varying the tension of said spring independently of the tension of the first mentioned spring.

FRANCIS RUDOLPH GOEHRING.

REFERENCES CITED

The following references are of record in the file of this patent:

UNITED STATES PATENTS

| Number | Name | Date |
|---|---|---|
| 2,012,427 | Haun | Aug. 27, 1935 |

FOREIGN PATENTS

| Number | Country | Date |
|---|---|---|
| 183,204 | Great Britain | of 1921 |